United States Patent
Clarke (10) Patent No.: US 10,909,189 B2
(45) Date of Patent: Feb. 2, 2021

(54) SERVICE-BACKED CONTEXTUAL DOCUMENT EMBEDDING

(71) Applicant: Microsoft Technology Licensing, LLC, Redmond, WA (US)

(72) Inventor: Christopher James Clarke, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 76 days.

(21) Appl. No.: 15/958,752

(22) Filed: Apr. 20, 2018

(65) Prior Publication Data

US 2019/0325032 A1    Oct. 24, 2019

(51) Int. Cl.
| G06F 17/00 | (2019.01) |
| G06F 16/93 | (2019.01) |
| G06F 3/0481 | (2013.01) |
| G06F 40/106 | (2020.01) |
| G06F 40/131 | (2020.01) |

(52) U.S. Cl.
CPC ............ *G06F 16/94* (2019.01); *G06F 3/0481* (2013.01); *G06F 40/106* (2020.01); *G06F 40/131* (2020.01)

(58) Field of Classification Search
CPC ................................ G06F 17/211; G06F 17/24
See application file for complete search history.

(56) References Cited

U.S. PATENT DOCUMENTS

| 5,835,919 | A | * | 11/1998 | Stern | ..................... | G06F 3/0481 |
| | | | | | | 715/209 |
| 7,089,248 | B1 | | 8/2006 | King et al. | | |
| 8,185,826 | B2 | | 5/2012 | Farouki | | |
| 9,286,276 | B2 | | 3/2016 | Cairns et al. | | |
| 9,747,257 | B2 | | 8/2017 | Tse et al. | | |
| 9,875,228 | B1 | * | 1/2018 | Hall | ...................... | G06F 17/246 |
| 2007/0265923 | A1 | * | 11/2007 | Krassner | ............ | G06Q 30/0256 |
| | | | | | | 705/14.51 |
| 2009/0055755 | A1 | | 2/2009 | Hicks et al. | | |
| 2010/0005411 | A1 | | 1/2010 | Duncker et al. | | |

(Continued)

FOREIGN PATENT DOCUMENTS

| EP | 1350392 B1 | 1/2009 |
| WO | 2008042875 A2 | 4/2008 |

OTHER PUBLICATIONS

"Displaying PDF Files with PDF.js Library", Retrieved From: https://web.archive.org/web/20150802120251/https://developer.tizen.org/community/tip-tech/displaying-pdf-files-pdf.js-library, Aug. 2, 2015, 5 Pages.

(Continued)

*Primary Examiner* — Scott T Baderman
*Assistant Examiner* — Barbara M Level
(74) *Attorney, Agent, or Firm* — Rainier Patents, P.S.

(57) ABSTRACT

Described herein is a system and method for embedding an electronic file in a document canvas of an application. User input of an electronic file to be embedded in a document canvas of an application is received. Information regarding the electronic file to be embedded, a target page and/or a user is analyzed to determine parameter(s) regarding representation of the electronic file in the document canvas. The electronic file is embedded in the document canvas of the application in accordance with the determined at least one parameter regarding representation of the electronic file in the document canvas.

20 Claims, 7 Drawing Sheets

(56) References Cited

U.S. PATENT DOCUMENTS

| | | | |
|---|---|---|---|
| 2010/0180213 A1* | 7/2010 | Karageorgos | G06F 16/93 |
| | | | 715/753 |
| 2012/0066574 A1* | 3/2012 | Lee | G06F 40/18 |
| | | | 715/202 |
| 2013/0174032 A1* | 7/2013 | Tse | G06F 17/212 |
| | | | 715/273 |
| 2013/0322707 A1* | 12/2013 | Phillips | H04N 1/32101 |
| | | | 382/118 |
| 2015/0256568 A1* | 9/2015 | Osmond | G06Q 50/01 |
| | | | 715/753 |
| 2016/0239673 A1 | 8/2016 | Fascenda et al. | |

OTHER PUBLICATIONS

"pdf.js Tutorial—How to display a PDF with Javascript", Retrieved From: https://web.archive.org/web/20171007000114/http://usefulangle.com/post/20/pdfjstutorial-1-preview-pdf-during-upload-wih-next-prev-buttons, Dec. 6, 2016, 10 Pages.

"International Search Report and Written Opinion Issued in PCT Application No. PCTUS2019026203", dated Jul. 4, 2019, 12 Pages.

"Embed a Live Google Spreadsheet into a Google Document", Retrieved from <<https://www.prolificoaktree.com/cloud-software/53-embed-a-google-spreadsheet-into-a-google-document>>, Oct. 20, 2017, 8 Pages.

* cited by examiner

SERVICE-BACKED CONTEXTUAL DOCUMENT EMBEDDING

BACKGROUND

Word processing, spreadsheet, database, slide presentation, electronic mail, drawing, note taking, web browser, media player, and game applications allow users to view, create, and/or edit documents. Frequently, users desire to include (e.g., embed) document(s) within another document.

SUMMARY

Described herein is a system for embedding an electronic file, comprising: a computer comprising a processor and a memory having computer-executable instructions stored thereupon which, when executed by the processor, cause the computer to: receive user input of an electronic file to embed in a document canvas of an application; analyze information regarding information regarding the user and/or information regarding a target page to determine at least one parameter regarding representation of the electronic file in the document canvas; and embed the electronic file in the document canvas of the application in accordance with the determined at least one parameter regarding representation of the electronic file in the document canvas.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Various technologies pertaining to using contextual information to embed an electronic document (e.g., file) within a document canvas of an application are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding embedding an electronic file in a document canvas of an application. What follows are one or more exemplary systems and methods.

Aspects of the subject disclosure pertain to the technical problem of embedding an electronic file in a document canvas of an application. The technical features associated with addressing this problem involve receiving user input of an electronic file to embed in a document canvas of an application; analyzing information regarding the electronic file to be embedded, information regarding a target page, and/or information associated with a user to determine parameter(s) regarding representation of the electronic file in the document canvas; and embedding the electronic file in the document canvas of the application in accordance with the determined parameter(s) regarding representation of the electronic file in the document canvas. Accordingly, aspects of these technical features exhibit technical effects of more efficiently and effectively embedding electronic file(s) thus reducing computer resource(s) and/or increasing user satisfaction.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

Figure 1:
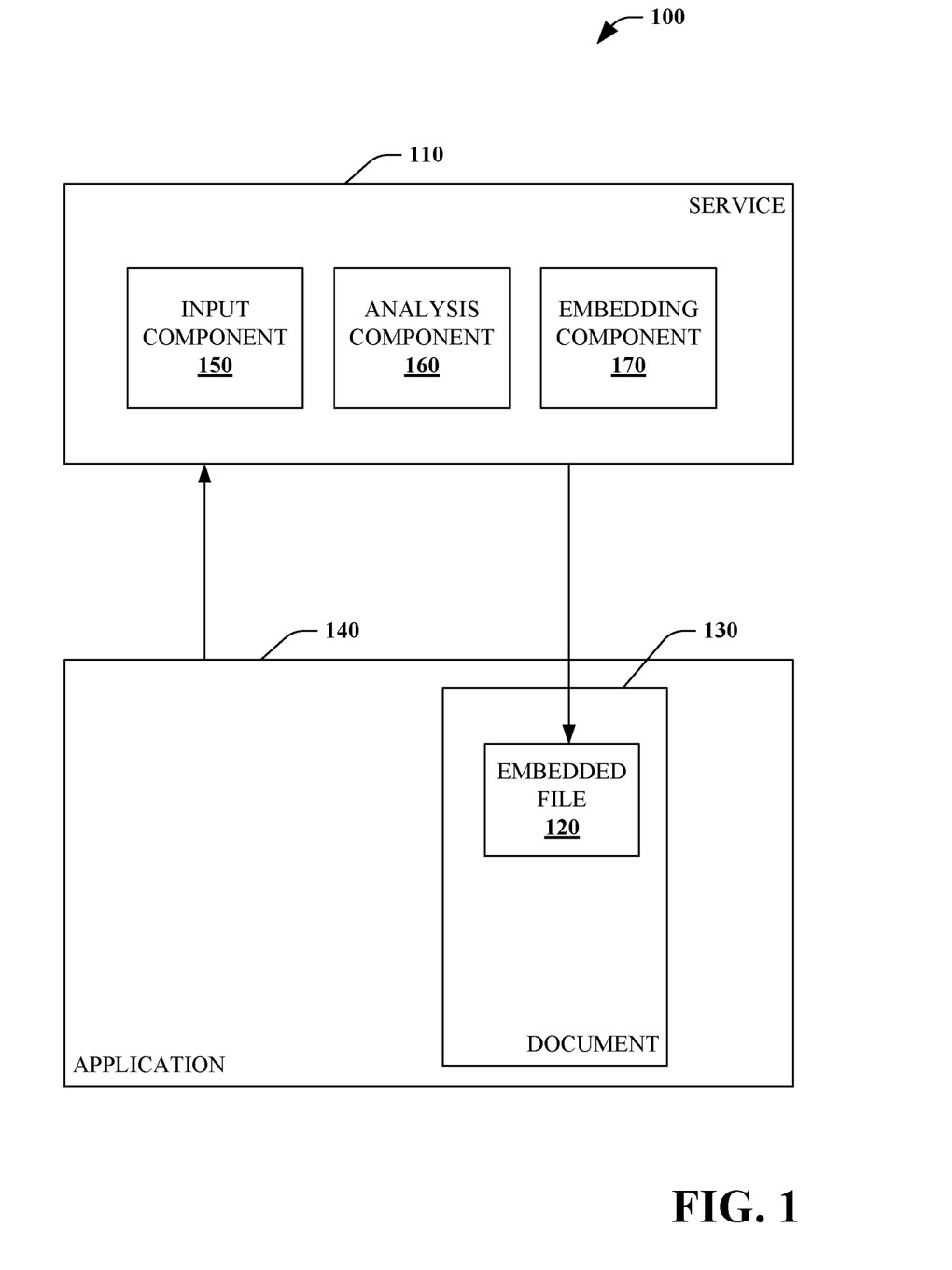
FIG. 1 is a functional block diagram that illustrates a system for embedding an electronic file.

Referring to FIG. 1, a system for embedding an electronic file 100 is illustrated. In some embodiments, embedded document(s) within a notetaking application (e.g., OneNote®) replicate the idea of using a binder to store multiple disparate kinds of content (e.g., document(s)). In some embodiments, by embedding document(s) in a document canvas, a user can gain the additional benefits of having a collaborative markup area where multiple user(s) can attach ink, picture(s), text, and/or other embedded document(s) together into a freeform collaboration service.

The system 100 includes a service 110 (e.g., standalone and/or cloud-based) that utilizes available information, for example, regarding the electronic document to be embedded (e.g., metadata and/or content), information regarding a target page, information regarding a user, for example, performing the embedding (e.g., user identifier, group membership), information regarding an entity associated with the user (e.g., school, corporation) to make a contextually relevant determination of parameter(s) of how the embedded electronic file 120 will be represented in a document canvas 130 of an application 140. Thus, in some embodiments, the service 110 can intelligently embed and size a representation of the electronic file 120 based, for example, on file type, file contents, content size, keyword(s) and/or embedder (e.g., user, administrator) preference(s). Examples of suitable applications 140 include, but are not limited to, word processing, spreadsheet, database, slide presentation, electronic mail, drawing, note taking, web browser, media player, and/or game applications.

The service 110 includes an input component 150 that receives user input of electronic file(s) to embed in the document canvas 130 of the application 140. In some embodiments, the user triggers a graphical user interface using a control (e.g., "embed file") within the application 140. In some embodiments, the user triggers the graphical user interface using a trigger entry within the document canvas 130 (e.g., predetermined and/or user-configurable character(s) which invoke the embed electronic file(s) graphical user interface). From the graphical user interface, the user can select electronic file(s) to be embedded in the document canvas 130 (e.g., highlight file(s) and click "embed" control).

The service 110 further includes an analysis component 160 that analyzes information regarding the electronic file(s) to be embedded to determine parameter(s) regarding representation of the electronic file(s) in the document canvas 130. In some embodiments, the information regarding the electronic file(s) includes content of the electronic file(s). For example, the analysis component 160 can determine a schema and/or format of content within the electronic file (e.g., spreadsheet labeled "budget" and containing twelve columns is likely a yearly budget). Based upon the determined schema and/or format of the content, the analysis component 160 can determine parameter(s) to be utilized regarding representation of the electronic file in the document canvas (e.g., height, width, auto-activation, thumbnail image).

In some embodiments, the information regarding the electronic file(s) includes metadata associated with the electronic file(s). In some embodiments, the metadata can include time and/or date of creation of the electronic file(s), time and/or date of last edit of the electronic file(s), a user identifier associated with user that created the electronic file(s), user identifier(s) associated with user(s) who have read the electronic file(s)), a quantity of user(s) who have read the electronic file(s), and/or a minimum time spent reading the electronic file(s). For example, when a user selects three electronic files of a same type (e.g., .doc) and content structure (e.g., budget), the analysis component 160 can determine to embed the three electronic files from left-to-right, in the chronological order in which the electronic files were created. For example, for an electronic file read by more than a predetermined number of users (e.g., twenty), the system 100 can embed the full content of the electronic file, otherwise a short preview can be embedded.

In some embodiments, the information regarding the electronic file(s) includes document type(s) of the electronic file(s). For example, the analysis component 160 can determine that electronic file(s) of a particular type (e.g., word processing files) are to be embedded with a viewer while electronic file(s) of another particular type (e.g., spreadsheet files) are to be embedded with an embedded editor.

In some embodiments, the analysis component 160 further analyzes information regard the user (e.g., user identifier, group membership, role). In some embodiments, the analysis component 160 determines parameter(s) regarding representation of the electronic file in the document canvas for members of a particular group (e.g., educators) and different parameter(s) for members of another particular group (e.g., education entity administrators).

In some embodiments, the analysis component 160 further analyzes information regarding an entity associated with the user. In some embodiments, the analysis component 160 determines parameter(s) regarding representation of the electronic file in the document canvas for members of a particular type of entity (e.g., school) and different parameter(s) for members of another particular type of entity (e.g., non-profit corporation). In some embodiments, the analysis component 160 further analyzes information regarding a target page.

The service 110 further includes an embedding component 170 that embeds the electronic file(s) 120 in the document canvas 130 of the application 140 in accordance with the determined parameter(s) regarding representation of the electronic file(s) 120 in the document canvas 130.

Thus, in some embodiments, by using information available to the service 110 (e.g., user identity, information about document, content of the document), the service 110 can make contextually relevant decisions about the parameter(s) of how the application 140 represents the electronic file in the document canvas 130. This can increase user satisfaction with the application 140 and service 110.

Figure 2:
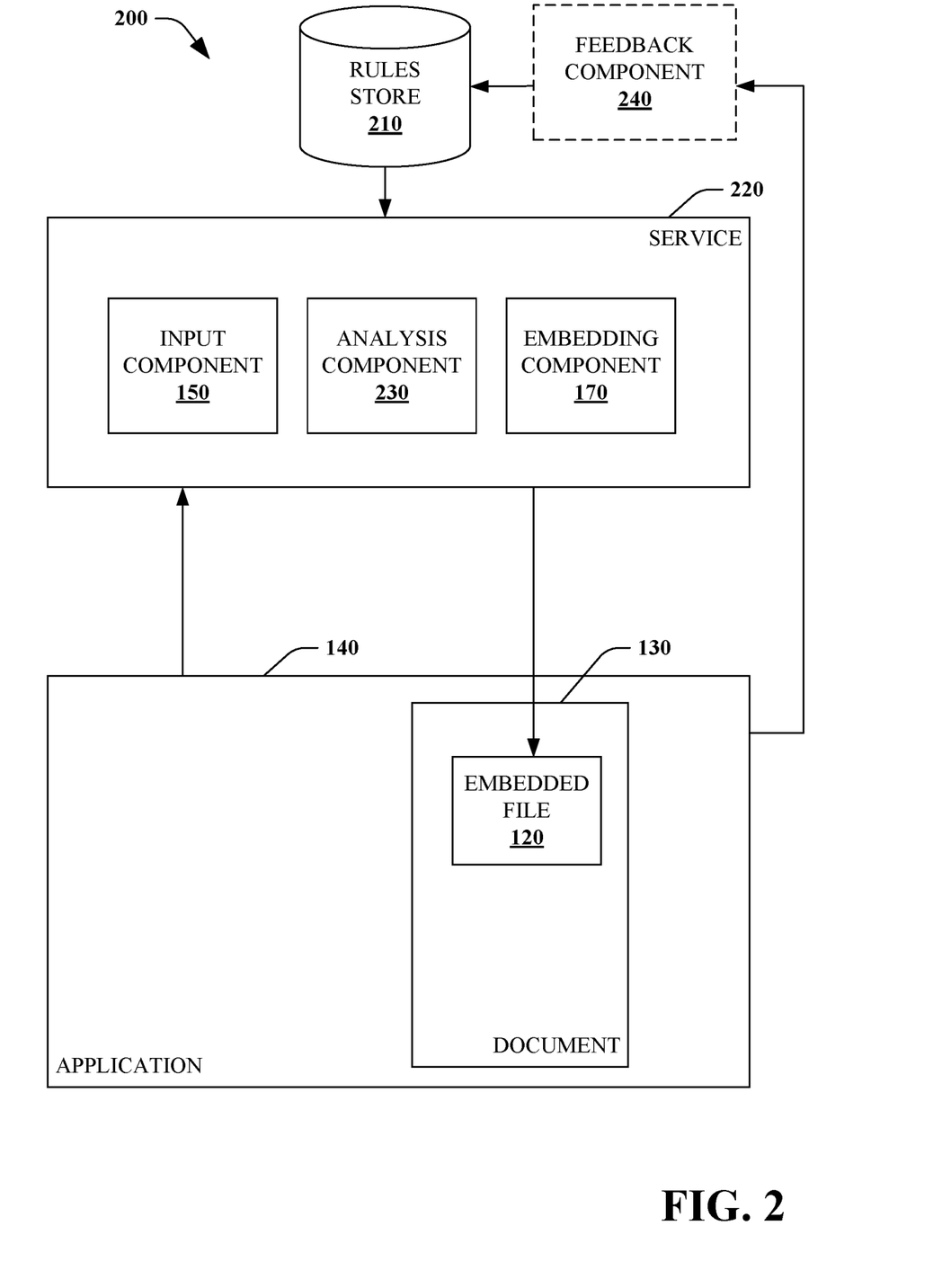
FIG. 2 is a functional block diagram that illustrates another system for embedding an electronic file.

Turning to FIG. 2, a system for embedding an electronic file 200 is illustrated. The system 200 utilizes rule(s) in a rule store 210 when determining parameter(s) regarding representation of electronic file(s) in the document canvas 130. In some embodiments, the rule(s) are defined by a user, an administrator, and/or an entity.

In some embodiments, the rule(s) are machine-learned. In some embodiments, the rules are based upon a model trained (e.g., learned) using offline embedded electronic files and actual (e.g., observed) parameter(s) for representing the embedded electronic files. Training can be performed in a supervised, unsupervised and/or semi-supervised manner. Parameter(s) generated and/or probabilities calculated by the model can be compared with the actual (e.g., observed) with the model being adjusted accordingly.

The system 200 includes a service 220 (e.g., standalone and/or cloud-based) having an input component 150 and an embedding component 170, as discussed above. The service 220 further includes an analysis component 230 that analyzes the electronic file(s) to be embedded (e.g., metadata and/or content), information regarding the user performing the embedding (e.g., user identifier, group membership), information about a target page for the electronic file to be embedded in and/or information regarding an entity associated with the user (e.g., school, corporation) to make a contextually relevant determination of parameter(s) of how the service 220 represents the embedded electronic document 120 in the document canvas 130 of the application 140. In some embodiments, the service 220 initially ensures that an embedded viewer and/or editor of the particular type of electronic file is able to be embedded.

In some embodiments, the analysis component 230 utilizes rule(s) stored in the rules store 210 when determining parameter(s) regarding representation of electronic file(s) in the document canvas 130. In some embodiments, the rule(s) can be based on content of the electronic file(s) to be embedded. For example, when embedding a word processing document having a report and/or schema format, embed the document full-sized with a viewer.

In some embodiments, the rule(s) can be based on metadata associated with the electronic file(s) to be embedded. For example, when embedding a spreadsheet document with "budget" in the file name, an editor can be embedded (e.g., based upon a user preference).

In some embodiments, the rule(s) can be based on information regarding the user performing the embedding. For example, for user(s) having a particular group membership, video file(s) can be embedded at a particular size (e.g., as thumbnails with a predetermined size).

In some embodiments, the rule(s) can be based on an entity associated with the user. For example, for users associated with the entity and electronic file(s) that have been viewed by the CEO, the electronic file can be embedded in full-size.

In some embodiments, the rules are organized hierarchically with parameter(s) of higher ranked rule(s) having precedence over the same parameter(s) of lower ranked rule(s). In some embodiments, when not conflicting, the rules are concatenated and applied (e.g., simultaneously). For example, a high ranking rule may be concerned with only one parameter for a particular type of file (e.g., embed viewer for spreadsheet file(s)), while another lower ranking rule may be concerned with a different parameter for a particular type of user (e.g., embed document full-size for teachers).

In some embodiments, a rule can include one, some or all of the following parameters which are used to match against electronic file(s) selected to be embedded to determine parameter(s) for representing the embedded file in a document canvas:

Rule Name: a string uniquely identifying a particular rule;

Tenant Name: a string identifying an entity associated with the user;

Rule Configured by: an enumeration of {user, administrator, entity} associated with ownership of the rule;

File Type: a target file type which is an enumeration of the type(s) of electronic files to which the rule applies;

Rule Triggers: a list of trigger(s) that, in some embodiments, are specific matched triplets that include known metadata (e.g., File Name, CreatedDate, CreatedBy, ModifiedDate, UploadedDate, FileText, ReadCount, ShareCount, MinimumTimeSpentReading), a conditional comparison (e.g. =, >, <, Contains, DoesNotContain), and/or data to compare against (e.g. a Date, a string). In some embodiments, a rule can have one or more triggers. In some embodiments, a rule has at least one trigger.

Embed Height: integer—the chosen height in pixels for a particular embed. In some embodiments, a particular value (e.g., "−1") can be used to signal that the canvas document and/or the application is responsible for calculating the height required to display the entire electronic file at its current width.

Embed Width: integer, the chosen width in pixels for a particular embed.

In some embodiments, one or more optional parameters can be specified in a particular rule to allow more granular control, for example, over who sees the embed and/or how the embed behaves:

Array <UserID> targeted users:

This allows specific rule(s) to be filtered to group(s) and/or individual user(s) within a particular entity. In some embodiments, a default can be for a rule to be applied to all users within a particular entity if the rule is configured by an administrator and/or entity or to a specific user if configured by that specific user.

Auto Activate: Boolean, in some embodiments, if this is present in a rule, the system 200 will embed the electronic file to be auto-activated inside the document canvas instead of requiring user interaction to become live.

The embedding component 170 embeds the electronic file(s) 120 in the document canvas 130 of the application 140 in accordance with the parameter(s) determined by the analysis component 230. Thus, in some embodiments, by using information available to the service 220 (e.g., user identity, information about document, content of the document), the service 220 can apply rule(s) to make contextually relevant decisions about the parameter(s) of how the application 140 represents the electronic file 120 in the document canvas 130. Optionally, the system 200 can include a feedback component 240 that adapts rule(s) stored in the rules store 210 based upon user input regarding representation of the electronic file 120 in the document canvas 130.

Figure 3:
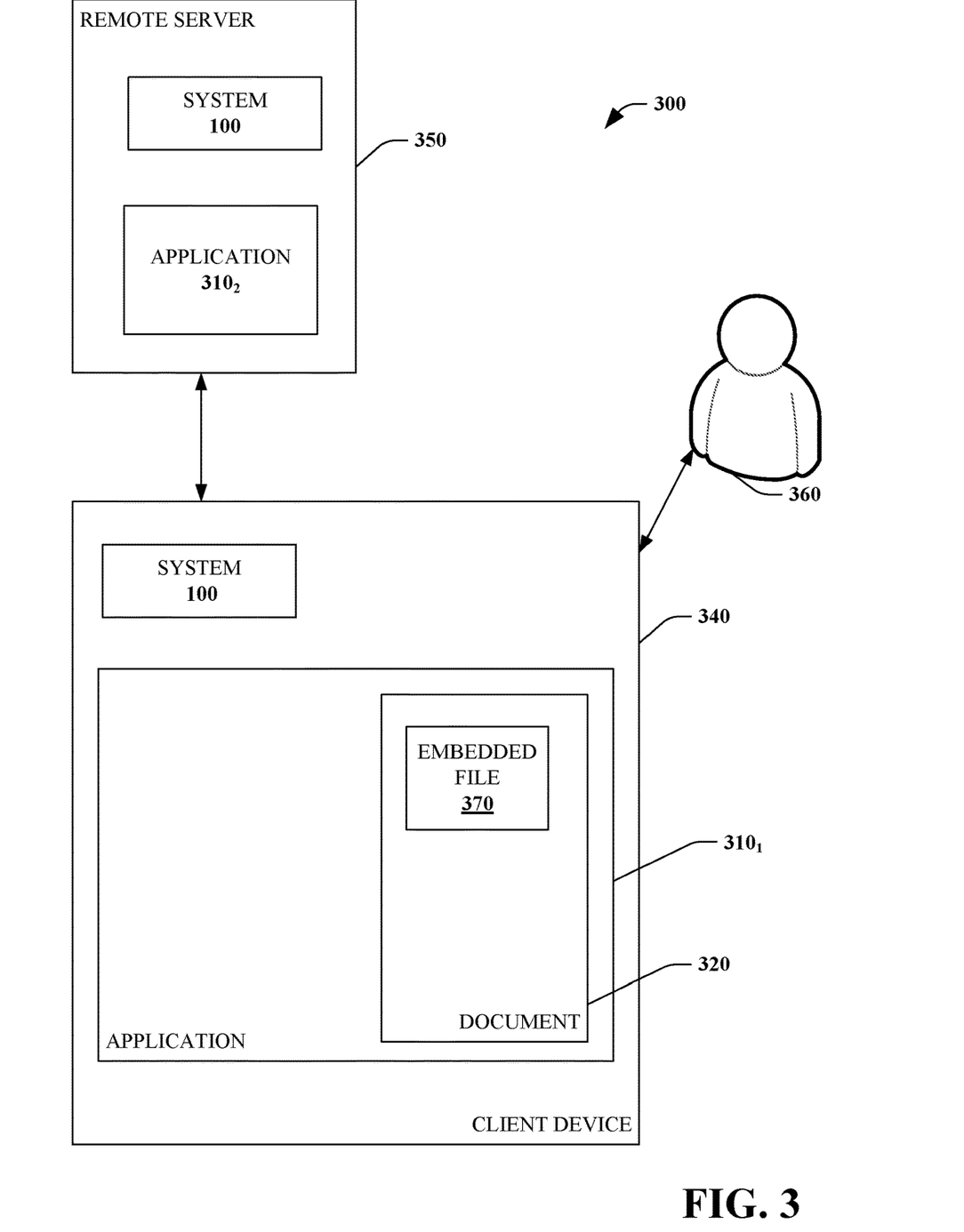
FIG. 3 is a functional block diagram that illustrates a system for embedding an electronic file.

Referring to FIG. 3, a system for embedding an electronic file 300 is illustrated. The system 300 includes an application $310_1$, $310_2$ (generally, 310) used to view, generate, and/or edit an electronic document 320 (e.g., electronic file). Examples of suitable applications 310 include, but are not limited to, word processing, spreadsheet, database, slide presentation, electronic mail, drawing, note taking, web browser, media player, and game applications.

In some embodiments, the application $310_1$ is a thick client application stored locally on a client device 340. In some embodiments, the application $310_2$ is thin client application (i.e., web applications) that resides on a remote service 350 and accessible over a network or combination of networks (e.g., the Internet, wide area networks, local area networks). A thin client application $310_2$ can be hosted in a browser-controlled environment or coded in a browser-supported language and reliant on a common web browser to render the application executable on the client device 340.

A user 360 can use the application 310 to create a new document 320, edit an existing document 320, and/or view an existing document 320. The application 310 receives input from the user 360, for example, text input, from one or more input devices including, for example, a keyboard, a computer mouse, a remote control. In some embodiments, the application 310 receives input from the user 360 through a Natural User Interface (NUI) which enables the user to interact with the client device 340 in a natural manner. Examples of NUI include speech recognition, touch and stylus recognition, gesture recognition both on screen and adjacent to the screen, air gestures, head and eye tracking, voice and speech, vision, touch, hover, gestures, machine intelligence, and the like.

The user input results in an electronic file 370 being embedded in the document 320. In some embodiments, the electronic file 370 is embedded within a document canvas (e.g., a page in a note taking document, a page in a word processing document, a spreadsheet in a spreadsheet document, a slide in a presentation document) of the document 320.

The system 300 can include the system 100 and/or the system 200 that embeds electronic file(s) in the document 320. In some embodiments, the system 100 and/or the system 200 execute on the remote server 350. In some embodiments, the system 100 and/or the system 200 execute on the client device 340.

Figure 4:
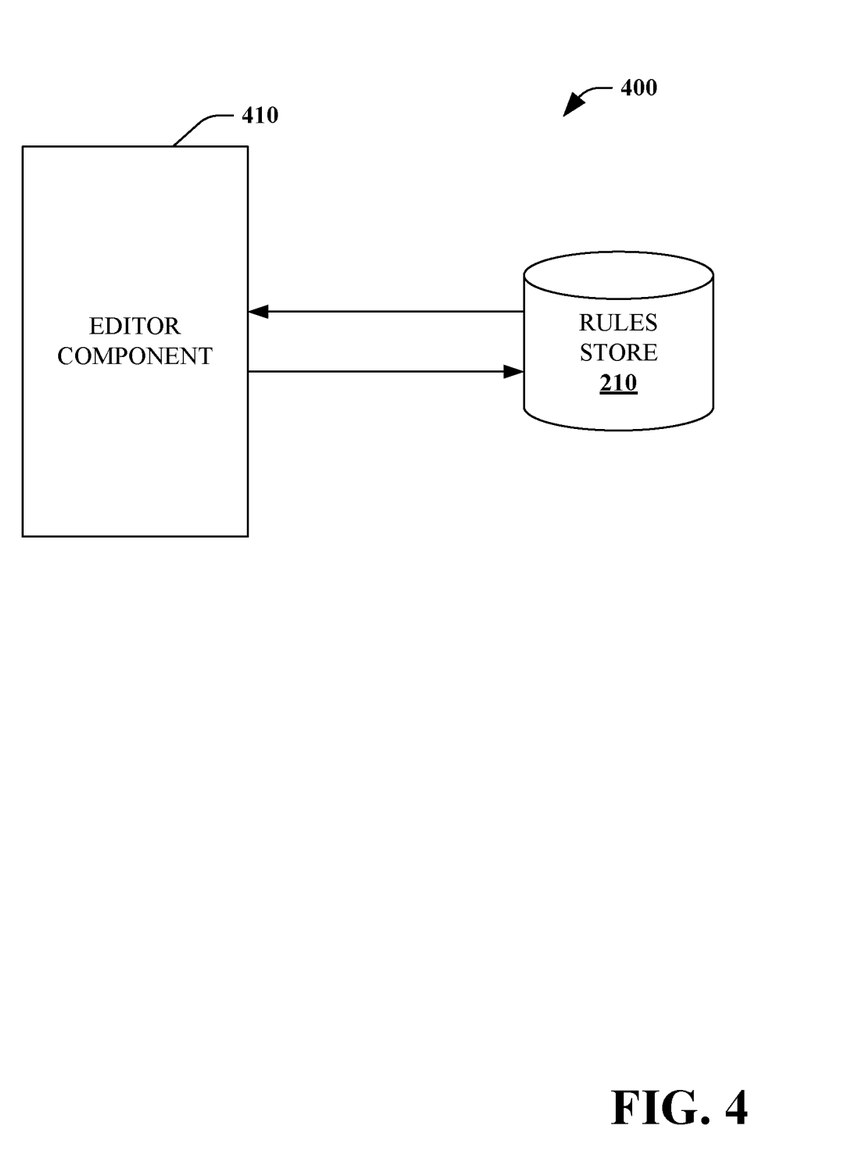
FIG. 4 is a functional block diagram that illustrates a system for editing rules.

Referring to FIG. 4, a system for editing rules 400 is illustrated. The system 400 can be utilized, for example, by a user and/or an administrator to define and/or edit rule(s) to be utilized by the system 200 when determining parameter(s) regarding representation of electronic file(s) in a document canvas.

The system 400 includes an editor component 410 that allows the user and/or administrator to view, create and/or edit rule(s) stored in the rules store 210. In some embodiments, using the editor component 410, the user and/or administrator can define a plurality of rules which are applied hierarchically when embedding electronic file(s) into a document canvas.

In some embodiments, the editor component 410 can provide a list of suggested template rules that can be switched on/off with ease, and also contains a user interface for creating new rule(s) either by duplicating and modifying an existing template, or by starting from scratch. In some embodiments, once a rule is enabled, the rule will be used for all future embeds for that entity as the list is updated on each embed for that entity.

For example, if an administrator chooses to the administrator can alter all processing documents in a folder to be embedded in the same templated way, for instance if a user is embedding a document from a shared folder called "Meeting Minutes", based upon the rule(s), the administrator can specify that the document is to be embedded to default to exposing the entire document, instead of a fixed length preview. In some embodiments, the rule(s) can be based upon content. For example, if a document is very short (e.g., spreadsheet having only 1 sheet containing 10 rows) embedding the controls to move between sheets inside the spreadsheet and more than 10 rows would be a waste of canvas space. Thus, a rule can be defined that prevents embedding of controls for such documents.

In some embodiments, the rules can be applied to a plurality of kinds of documents to be embedded. For example, choosing to hide/show Presenter Speaker notes in a slide presentation, and/or choosing to hide/show document editing tools if the user only has read-only access to the document.

Using the system 400, subscription administrator(s) and/or user(s) can have granular control over how their external content is displayed inside the document canvas. It further allows for the definition of more intelligent embed styles and/or formats for specific kinds of content. For example, if a filename has All Hands Deck in it the system 400 can be confident it is an All Hands deck and should be embedded with a display of the speaker's notes.

Figure 5:
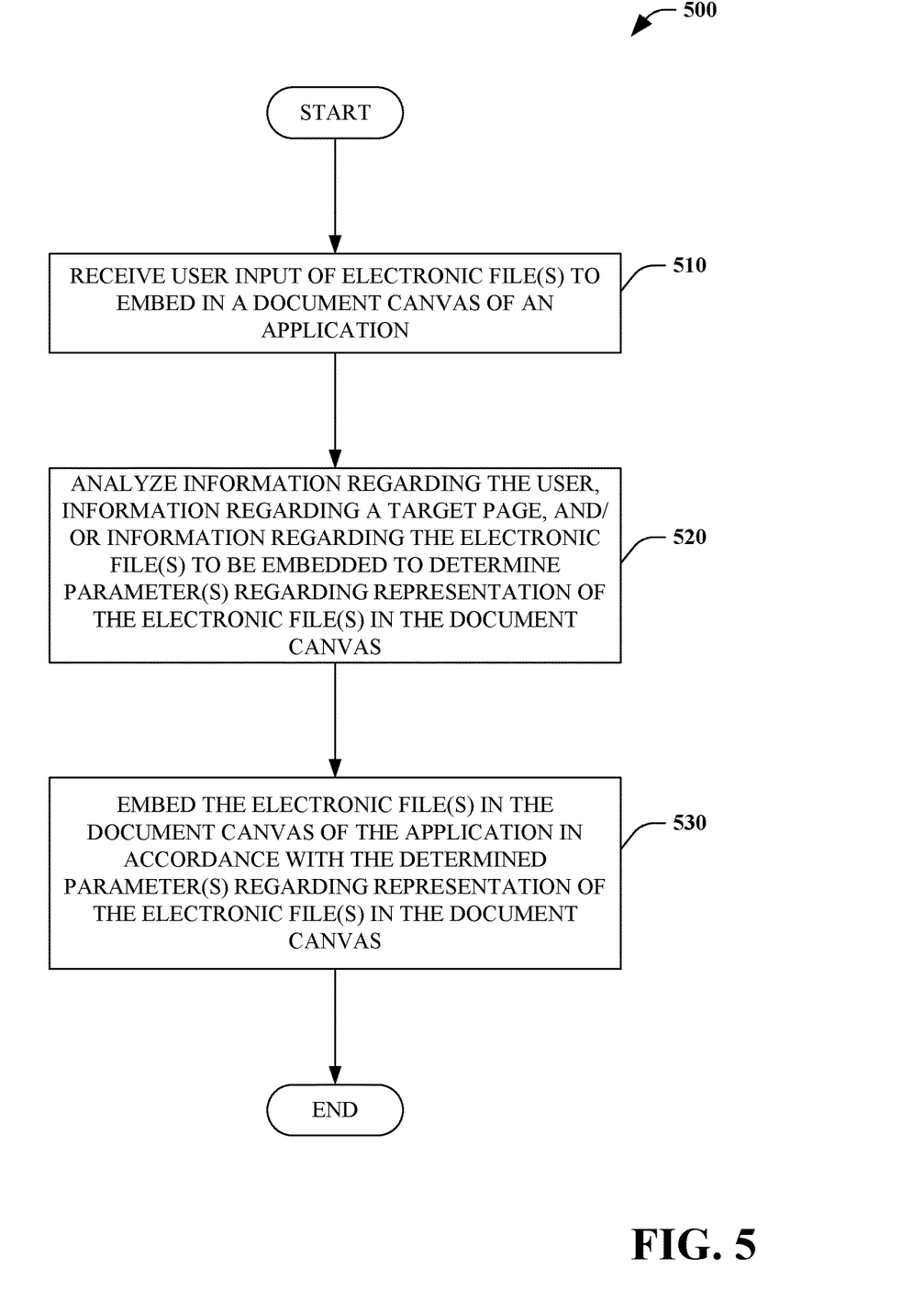
FIG. 5 is a flow chart that illustrates a method of embedding an electronic file.
Figure 6:
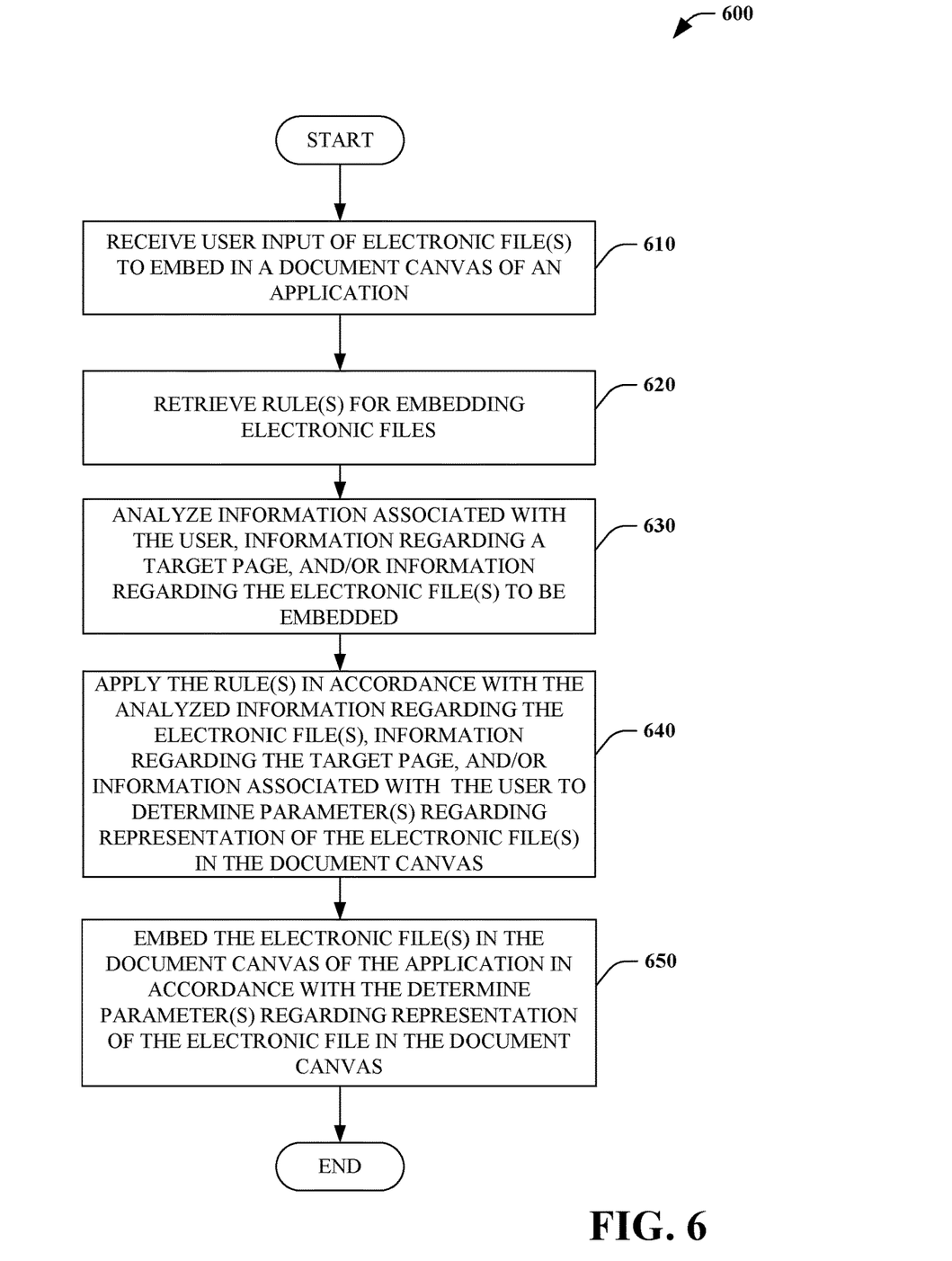
FIG. 6 is a flow chart that illustrates another method of embedding an electronic file.

FIGS. 5 and 6 illustrate exemplary methodologies relating to determining parameter(s) regarding representation of embedded electronic file(s) in a document canvas. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIG. 5, a method of embedding an electronic file 500 is illustrated. In some embodiments, the method 500 is performed by the system 100.

At 510, user input of electronic file(s) to be embedded in a document canvas of an application is received. At 520, information regarding the user (e.g., user identifier, entity), information reading a target page, and/or information regarding the electronic files (e.g., metadata and/or content) to be embedded is analyzed to determine parameter(s) regarding representation of the electronic file(s) in the document canvas. At 530, the electronic file(s) are embedded in the document canvas of the application in accordance with the determine parameter(s) regarding representation of the electronic file(s) in the document canvas.

Turning to FIG. 6, a method of embedding an electronic file 600 is illustrated. In some embodiments, the method 600 is performed by the system 200.

At 610, user input of electronic file(s) to be embedded in a document canvas of an application is received. At 620, rule(s) for embedding electronic files are retrieved. At 630, information associated with the user, information regarding a target page, and/or information regarding the electronic file(s) to be embedded is analyzed.

At 640, the rule(s) are applied in accordance with the analyzed information regarding the electronic file(s), information regarding the target page, and/or information associated with the user to determine parameter(s) regarding representation of the electronic file(s) in the document canvas. At 650, the electronic file(s) are embedded in the document canvas of the application in accordance with the determined parameter(s) regarding representation of the electronic file(s) in the document canvas.

Described herein is a system for embedding an electronic file, comprising: a computer comprising a processor and a memory having computer-executable instructions stored thereupon which, when executed by the processor, cause the computer to: receive user input of an electronic file to embed in a document canvas of an application; analyze at least one of information regarding a target page of the document canvas or information regarding a user to determine at least one parameter regarding representation of the electronic file in the document canvas; and embed the electronic file in the document canvas of the application in accordance with the determined at least one parameter regarding representation of the electronic file in the document canvas.

The system can include wherein the at least one parameter comprises at least one of height, width, auto-activation, or a thumbnail image. The system can further include wherein the at least one parameter comprises at least one of embed with a view or embed with an editor. The system can include wherein the application is a word processing application, a spreadsheet application, a database application, a slide presentation application, an electronic mail application, a drawing application, a note taking application, a web browser application, a media player, or a game application.

The system can further include wherein the user input comprises a plurality of files to be embedded and the at least one parameter is determined based upon an analysis of information regarding the plurality of files. The system can include wherein the parameter is a configurable setting associated with embedding of the one or more electronic files.

The system can include the memory having further computer-executable instructions stored thereupon which, when executed by the processor, cause the computer to: analyze information regarding the electronic file to be embedded to determine the at least one parameter, wherein the information analyzed regarding the electronic file comprises content of the electronic file.

The system can include the memory having further computer-executable instructions stored thereupon which, when executed by the processor, cause the computer to: analyze information regarding the electronic file to be embedded to determine the at least one parameter, wherein the information analyzed regarding the electronic file comprises metadata associated with the electronic file. The system can further include wherein the computer is a component of a cloud-based service.

Described herein is a method of embedding an electronic file, comprising: receiving user input of one or more electronic files to embed in a document canvas of an application; retrieving one or more rules for embedding electronic files; analyze at least one of information regarding information regarding a target page or information associated with the user; applying the one or more rules in accordance with the analyzed at least one of information regarding the target page or information associated with the user to determine at least one parameter regarding representation of the one or more electronic files in the document canvas; and embedding the one or more electronic files in the document canvas of the application in accordance with the determined at least one parameter.

The method can include wherein a plurality of rules are applied hierarchically to determine the at least one parameter. The method can further include wherein a plurality of rules are concatenated and applied to determine the at least one parameter. The method can include analyzing information regarding the electronic file to be embedded; and applying the one or more rules further in accordance with the analyzed information regarding the electronic file to be embedded.

The method can further include wherein the rules are based on at least one of a type associated with the electronic file to be embedded, content of the electronic file to be embedded, a user embedding the electronic file or an entity associated with the user embedding the electronic file. The method can further include receiving feedback from a user regarding the parameter and adapting a rule based upon the user feedback.

Described herein is a computer storage media storing computer-readable instructions that when executed cause a computing device to: retrieve one or more rules for embedding electronic files; receive user input of one or more electronic files to embed in a document canvas of an application; analyze at least one of information regarding a target page or information associated with the user; apply the one or more rules in accordance with the analyzed at least one of information regarding the target page or information associated with the user to determine at least one parameter regarding representation of the one or more electronic files in the document canvas; and embed the one or more electronic files in the document canvas of the application in accordance with the determined at least one parameter.

The computer storage media can further include wherein a plurality of rules are applied hierarchically to determine the at least one parameter. The computer storage media can further include wherein a plurality of rules are concatenated and applied to determine the at least one parameter.

The computer storage media can store further computer-readable instructions that when executed cause a computing device to: analyze information regarding the electronic file to be embedded to determine the at least one parameter, wherein the rules are based on at least one of a type associated with the electronic file to be embedded, content of the electronic file to be embedded, a user embedding the electronic file or an entity associated with the user embedding the electronic file. The computer storage media can store further computer-readable instructions that when executed cause a computing device to: receive feedback from a user regarding the parameter and adapt a rule based upon the user feedback.

Figure 7:
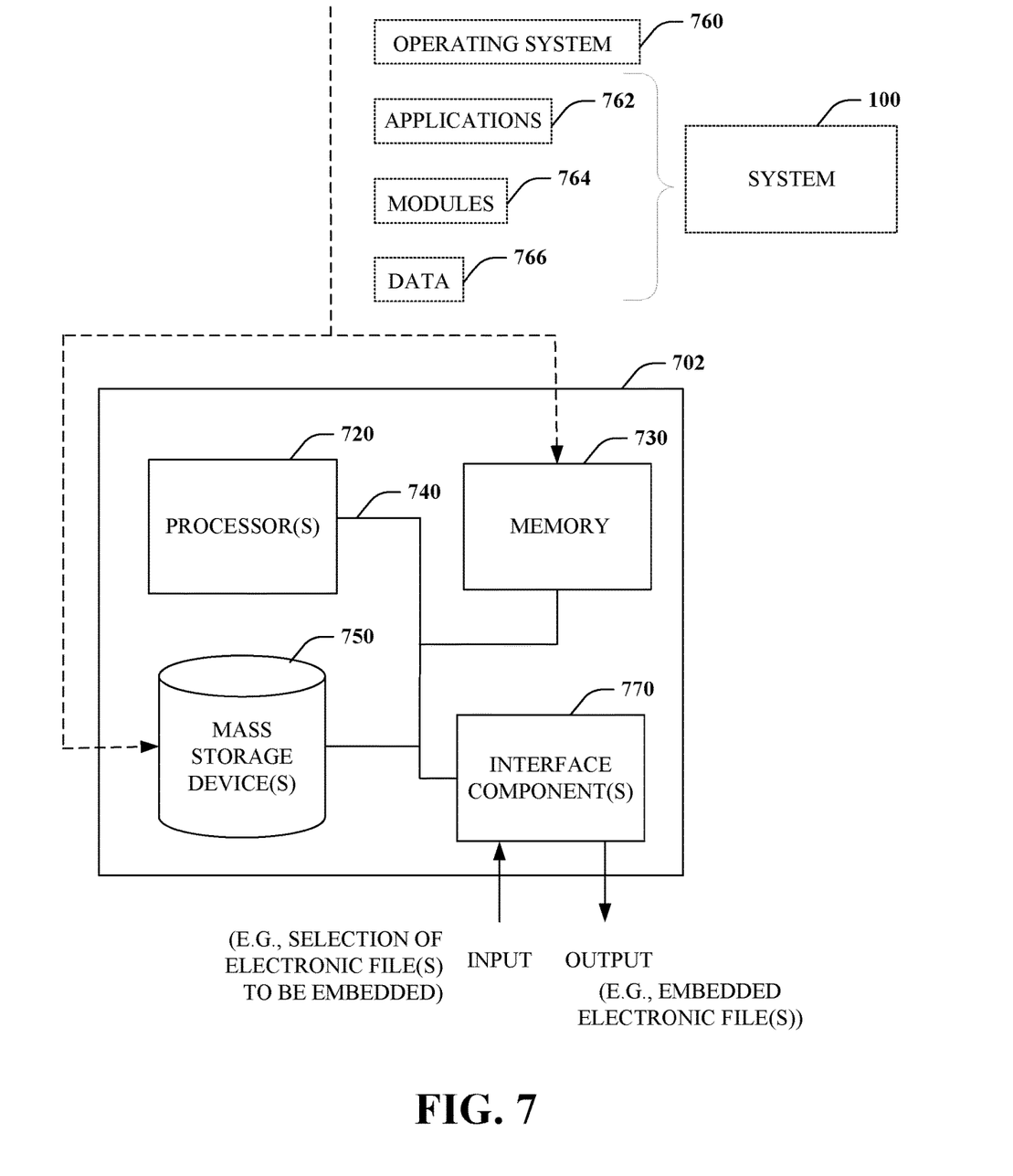
FIG. 7 is a functional block diagram that illustrates an exemplary computing system.

With reference to FIG. 7, illustrated is an example general-purpose computer or computing device 702 (e.g., mobile phone, desktop, laptop, tablet, watch, server, handheld, programmable consumer or industrial electronics, set-top box, game system, compute node, etc.). For instance, the computing device 702 may be used in a system for embedding an electronic file 100 and/or a system for embedding an electronic file 200.

The computer 702 includes one or more processor(s) 720, memory 730, system bus 740, mass storage device(s) 750, and one or more interface components 770. The system bus 740 communicatively couples at least the above system constituents. However, it is to be appreciated that in its simplest form the computer 702 can include one or more processors 720 coupled to memory 730 that execute various computer executable actions, instructions, and or components stored in memory 730. The instructions may be, for instance, instructions for implementing functionality described as being carried out by one or more components discussed above or instructions for implementing one or more of the methods described above.

The processor(s) 720 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 720 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 720 can be a graphics processor.

The computer 702 can include or otherwise interact with a variety of computer-readable media to facilitate control of the computer 702 to implement one or more aspects of the claimed subject matter. The computer-readable media can be any available media that can be accessed by the computer 702 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 702. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 730 and mass storage device(s) 750 are examples of computer-readable storage media. Depending on the exact configuration and type of computing device, memory 730 may be volatile (e.g., RAM), non-volatile (e.g., ROM, flash memory, etc.) or some combination of the two. By way of example, the basic input/output system (BIOS), including basic routines to transfer information between elements within the computer 702, such as during start-up, can be stored in nonvolatile memory, while volatile memory can act as external cache memory to facilitate processing by the processor(s) 720, among other things.

Mass storage device(s) 750 includes removable/non-removable, volatile/non-volatile computer storage media for storage of large amounts of data relative to the memory 730. For example, mass storage device(s) 750 includes, but is not limited to, one or more devices such as a magnetic or optical disk drive, floppy disk drive, flash memory, solid-state drive, or memory stick.

Memory 730 and mass storage device(s) 750 can include, or have stored therein, operating system 760, one or more applications 762, one or more program modules 764, and data 766. The operating system 760 acts to control and allocate resources of the computer 702. Applications 762 include one or both of system and application software and can exploit management of resources by the operating system 760 through program modules 764 and data 766 stored in memory 730 and/or mass storage device(s) 750 to perform one or more actions. Accordingly, applications 762 can turn a general-purpose computer 702 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 762, and include one or more modules 764 and data 766 stored in memory and/or mass storage device(s) 750 whose functionality can be realized when executed by one or more processor(s) 720.

In accordance with one particular embodiment, the processor(s) 720 can correspond to a system on a chip (SOC) or like architecture including, or in other words integrating, both hardware and software on a single integrated circuit substrate. Here, the processor(s) 720 can include one or more processors as well as memory at least similar to processor(s) 720 and memory 730, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 702 also includes one or more interface components 770 that are communicatively coupled to the system bus 740 and facilitate interaction with the computer 702. By way of example, the interface component 770 can be a port (e.g., serial, parallel, PCMCIA, USB, FireWire, etc.) or an interface card (e.g., sound, video, etc.) or the like. In one example implementation, the interface component 770 can be embodied as a user input/output interface to enable a user to enter commands and information into the computer 702, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 770 can be embodied as an output peripheral interface to supply output to displays (e.g., LCD, LED, plasma, etc.), speakers, printers, and/or other computers, among other things. Still further yet, the interface component 770 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system, comprising:
    a computer comprising a processor and a memory having computer-executable instructions stored thereupon which, when executed by the processor, cause the computer to:
    receive input requesting to embed an electronic file in a document canvas of an application, the electronic file having an associated creation date or last editing date;
    retrieve an embedding rule associating the creation date or the last editing date of the electronic file with an embedding height or an embedding width; and
    embed the electronic file in the document canvas of the application in accordance with the embedding height or the embedding width specified by the embedding rule.

2. The system of claim 1, the memory having further computer-executable instructions stored thereupon which, when executed by the processor, cause the computer to:
    receive other input requesting to embed another electronic file in the document canvas of the application, the other input being associated with a particular user identifier;
    analyze information indicating that the particular user identifier is associated with membership in a particular organization;

access embedding parameters specifying different embedding heights or embedding widths for different organizations;
determine a particular embedding height or a particular embedding width for the another electronic file based at least on particular embedding parameters associated with the particular organization; and
embed the another electronic file in the document canvas of the application at the particular embedding height or the particular embedding width.

3. The system of claim 2, the memory having further computer-executable instructions stored thereupon which, when executed by the processor, cause the computer to:
based at least on the particular organization, embed the electronic file with an embedded viewer or an embedded editor.

4. The system of claim 1, wherein the application is a word processing application, a spreadsheet application, a database application, a slide presentation application, an electronic mail application, a drawing application, a note taking application, a web browser application, a media player, or a game application.

5. The system of claim 1, the memory having further computer-executable instructions stored thereupon which, when executed by the processor, cause the computer to:
identify a label of another electronic file;
determine another embedding height or another embedding width for embedding the another electronic file based at least on the label; and
embed the another electronic file in accordance with the another embedding height or the another embedding width.

6. The system of claim 1, wherein the embedding rule associates the creation date with the embedding height or the embedding width.

7. The system of claim 1, wherein the embedding rule associates the last editing date with the embedding height or the embedding width.

8. The system of claim 1, the input being received via a graphical user interface.

9. The system of claim 1, wherein the computer is a component of a cloud-based service.

10. A method comprising:
receiving input requesting to embed an electronic file in a document canvas of an application, the electronic file having metadata relating to one or more other users that have read the electronic file;
based at least on the metadata relating to the one or more other users that have read the electronic file, retrieving one or more embedding rules, including a particular embedding rule that specifies a particular embedding height or a particular embedding width; and
embedding the electronic file in the document canvas of the application at the particular embedding height or the particular embedding width in accordance with the particular embedding rule.

11. The method of claim 10, wherein the metadata identifies another user that has read the electronic file and the particular embedding rule applies to electronic files that have been read by the another user.

12. The method of claim 10, wherein the metadata identifies a quantity of other users that have read the electronic file and the particular embedding rule applies to electronic files that have been read by the quantity of other users.

13. The method of claim 10, further comprising:
receiving feedback regarding the particular embedding height or the particular embedding width and adapting the particular embedding rule based at least upon the feedback.

14. The method of claim 10, wherein the particular embedding rule provides that full content of the electronic file is embedded when more than a predetermined number of other users have read the electronic file.

15. The method of claim 14, wherein the particular embedding rule provides that a preview of the electronic file is embedded when fewer than the predetermined number of other users have read the electronic file.

16. The method of claim 15, wherein the particular embedding rule specifies both the particular embedding height and the particular embedding width.

17. A computer storage media storing computer-readable instructions that, when executed, cause a computing device to:
receive input requesting to embed an electronic file in a document canvas of an application, the input being associated with a particular user identifier;
analyze information indicating that the particular user identifier is associated with membership in a particular organization;
retrieve one or more embedding rules for the particular organization, including a particular embedding rule that specifies a particular embedding height or a particular embedding width for members of the particular organization;
embed the electronic file in the document canvas of the application at the particular embedding height or the particular embedding width in accordance with the particular embedding rule; and
receive feedback regarding the particular embedding height or the particular embedding width and adapt the particular embedding rule based at least upon the feedback.

18. The computer storage media of claim 17, wherein the particular embedding rule specifies both the particular embedding height and the particular embedding width for electronic files embedded by the members of the particular organization.

19. The computer storage media of claim 17, storing further computer-readable instructions that, when executed, cause the computing device to:
based at least on the one or more embedding rules for the particular organization, embed the electronic file with an embedded viewer configured to display the electronic file at the particular embedding height or the particular embedding width.

20. The computer storage media of claim 17, storing further computer-readable instructions that, when executed, cause the computing device to:
based at least on the one or more embedding rules for the particular organization, embed the electronic file with an embedded editor configured to display the electronic file at the particular embedding height or the particular embedding width and provide editing functionality for the electronic file.

* * * * *